Patented Aug. 28, 1934

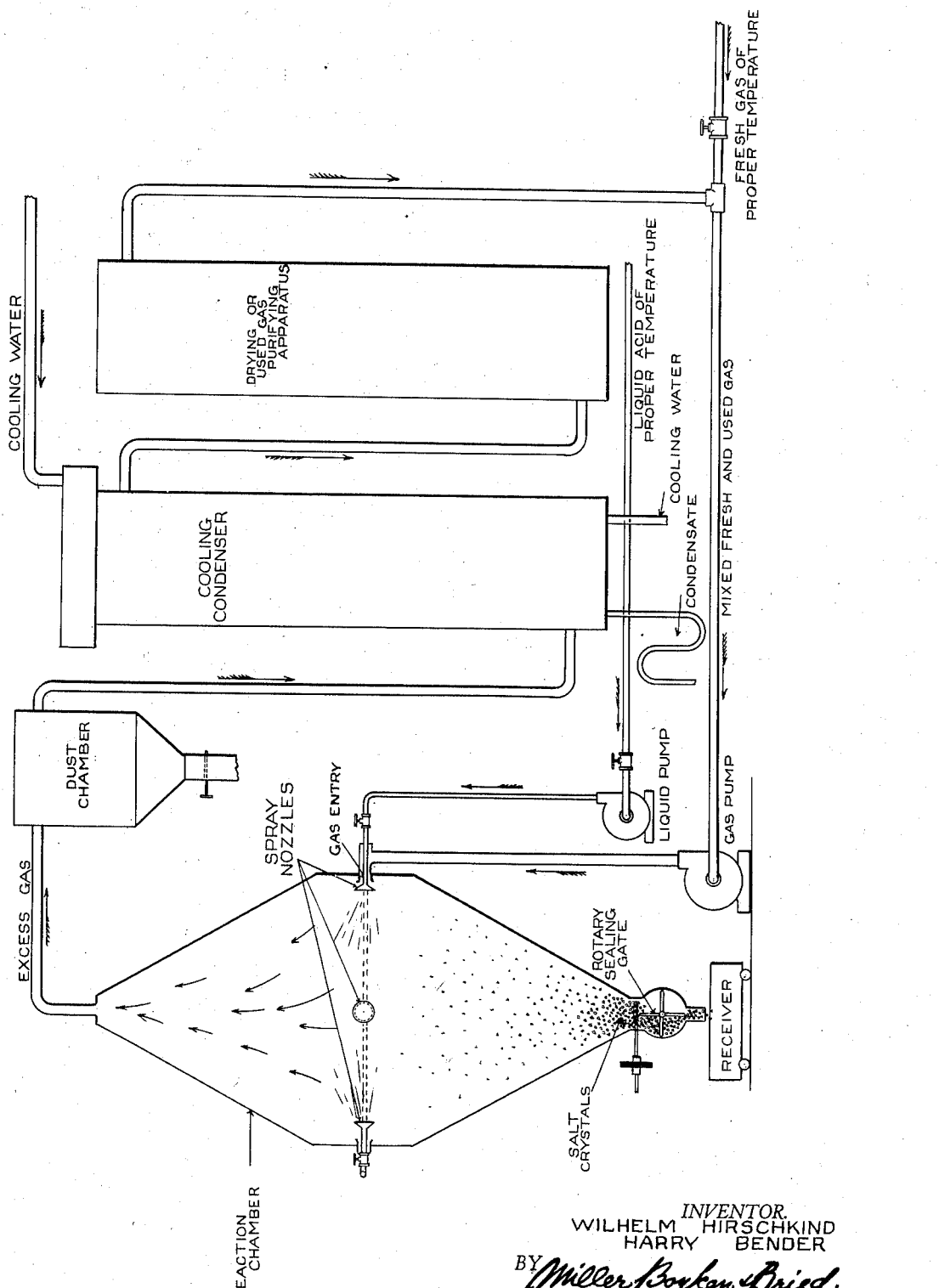

1,971,563

UNITED STATES PATENT OFFICE 1,971,563

PROCESS FOR MANUFACTURE OF AMMONIUM PHOSPHATES AND OTHER SALTS

Wilhelm Hirschkind and Harry Bender, Antioch, Calif., assignors to Great Western Electro-Chemical Co., San Francisco, Calif., a corporation of California Application February 19, 1929, Serial No. 341,267

2 Claims. (Cl. 23—107)

This invention relates to the production of salts and has for its objects an improved process for producing salts whereby the salts may be quickly and cheaply produced in quantity.

An object of our invention is a process as above wherein the bases and acids are respectively in the form of gases and liquids and their union operates as a continuous process.

Another object of the process is the control of the reaction heat principally by the amount of water carried by the liquid which is evaporated and carried out of the reaction chamber thus taking away any excess heat.

Another object is the cyclic use of the gaseous medium with constant admixture of fresh supply thereto and if necessary the constant removal of water vapor and/or other undesirable by-products.

Another object is the production of ammonium salts by said process, principally monoammonium and diammonium phosphates, ammonium sulphate and/or admixtures of these or compound (isomorphic) crystals thereof.

On the drawing accompanying this application the figure is an elevation showing diagrammatically the apparatus used to carry out the process, and with legends designating the parts.

Briefly described the process comprises atomizing into a chamber a spray of any liquid, while maintaining a constant circulation within the chamber of a gas adapted to react with the liquid to form the salt or chemical desired and of drawing off the product of the reaction from the bottom of the chamber.

Specifically, the invention comprises spraying phosphoric and/or sulphuric acid into the chamber while maintaining therein a circulation of ammonia gas and whereby phosphates or sulphates or isomorphic salts of both are formed.

The ammonia gas may be used in concentrated form or diluted with air, and the heat of reaction may be controlled as stated by the amount of water in the acid, a certain dilution of the acid or definite amount of water at a fixed spray temperature into the circulating ammonia gas also injected at fixed temperature will hold the reaction at a constant point so that the proper reaction will go on continuously.

The reaction temperature may also be controlled by predetermining the temperature of the gas and/or liquid before admitting same to the reaction chamber.

To produce monoammonium phosphate the entering gas is kept at about 20° centigrade and the phosphoric acid containing about 20% of water is atomized through suitable spray nozzles into the gas at about 20° C. This will keep the temperature of reactance above 80° C. and at or above which temperature only the monoammonium salt will be formed or can exist, as the diammonium salt will dissociate into monoammonium phosphate and ammonia at temperatures around 70° C.

If it is desired to produce the diammonium salt the temperature must be kept well below 80° C., in fact a temperature as low as 50° C. will yield a satisfactory product, and therefore the temperatures of admission of the combining agents must be varied accordingly and/or the water content of the acid increased to the point which will maintain the temperature of the reaction above or below the point desired.

The ammonia gas is kept in circulation through the reaction chamber and the uncombined gas carries off the water vapor and this is separated from the gas by suitable means while or after passing the gases through a cooling condenser preparatory to returning the gas to the chamber with an admixture of fresh gas for continuation of the process. Before passing the gas to the condenser it is desirable to remove suspended dust.

By substituting sulphuric acid, ammonium sulphate will be similarly formed, or by mixing the acids in various proportions the mixed or isomorphic crystalline salt will be formed.

The presence of a certain amount of moisture has been found necessary to carry out the reaction. The removal of this moisture from the reaction chamber is carried out as stated above and is so regulated that the evaporation of water is complete as soon as the desired combination is reached. In other words, the desired end point of the reaction and the driving out of the moisture should preferably be simultaneous.

The above process entirely overcomes the difficulties attendant upon the ordinary manufacture of ammonium phosphates effected through neutralizing of the acid with ammonia, separating the crystals from the liquor, as this procedure involves separate filtration and drying operations on account of the presence of iron and alumina compounds which yield at a certain ratio of ammonia and phosphoric acid practically unfilterable colloidal iron and alumina phosphates, thus making the separation of the ammonium phosphate crystals a difficult matter. Other processes have been devised which through use of a definite ratio of ammonia and phosphoric acid seek to avoid these colloidal substances, but nevertheless further treatment of the filtrate with ammonia is required and the processes are slow and costly to carry out.

The attached diagram of apparatus indicates the units above described by legends attached and will require no special description other than to state that any number of acid atomizers may be used, also gas injecting nozzles, and that under the reaction chamber may be a sealing discharge gate as shown adapted to give a continuous discharge of the salt. The excess gas is passed through a suitable dust trap as indicated before going to the cooling apparatus. The atomizing nozzles may be power-driven centrifugal atomizers or common pressure atomizing nozzles.

In contemplation of our invention as above disclosed it is manifest that other gases and combining liquids may be used in place of those given so as to produce a variety of chemicals, and the heat of the reaction may be held at the required point by either heating or cooling either the liquid, or gaseous reagent, or both, before bringing them together in the chamber, dependent on the reaction temperature required for the particular chemical produced. A few reacting agents and resulting products are listed below.

| Gas | Liquid | Salt produced |
| --- | --- | --- |
| Ammonia 80% to 20% of air. | Phosphoric acid containing 55% $P_2O_5$ (temperature kept above 80° C.). | Monoammonium phosphate. |
| Do | Phosphoric acid containing 42.3% $P_2O_5$ (temperature below 80° C.). | Diammonium phosphate. |
| Do | 10 parts phosphoric acid containing 36.7% $P_2O_5$ mixed with 8 parts sulphuric acid containing 98% $H_2SO_4$ (temperature kept below 80° C.). | Diammonium phosphate, ammonium sulphate isomorphic crystals containing 24% $NH_3$ and 25% $P_2O_5$. |
| Ammonia 50% to 50% of air. | Nitric acid containing 30% of water. | Ammonium nitrate. |
| Sulphur dioxide 10% to 90% of air. | Sodium carbonate saturated solution. | Sodium metabisulphite. |

Having thus described our invention, we claim:

1. The process of forming ammonium salts by direct reaction of ammonia gas with a liquid acid capable of forming various ammonia salts therewith depending on the temperature used which comprises atomizing a liquid acid into a chamber containing ammonia gas adapted to chemically combine therewith to form the salt desired while maintaining the reaction temperature at a point to produce the salt desired and sufficiently removed from the reaction temperature of the other salt to prevent forming any of the latter salt, said temperature being maintained through evaporation of the liquid not entering the combination to form the salt, carrying off the evaporated liquid with excess gas, removing the evaporated liquid from the excess gas and returning the excess gas to the chamber with admixture of fresh gas.

2. The process of forming ammonium salts by direct reaction of ammonia gas with a liquid acid capable of forming various ammonia salts therewith depending on the temperature used which comprises atomizing a liquid acid into a chamber containing ammonia gas adapted to chemically combine therewith to form the salt desired while maintaining the reaction temperature at a point to produce the salt desired and sufficiently removed from the reaction temperature of the other salt to prevent forming any of the latter salt, said temperature being maintained through evaporation of the liquid not entering the combination to form the desired salt.

WILHELM HIRSCHKIND.
HARRY BENDER.